(12) United States Patent
Hirashima

(10) Patent No.: US 6,940,788 B2
(45) Date of Patent: Sep. 6, 2005

(54) DISC APPARATUS AND A METHOD FOR ACTIVATING A FOCUSING SERVO

(75) Inventor: Minoru Hirashima, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 301 days.

(21) Appl. No.: 10/202,888

(22) Filed: Jul. 26, 2002

(65) Prior Publication Data

US 2003/0026178 A1 Feb. 6, 2003

(30) Foreign Application Priority Data

Aug. 6, 2001 (JP) ..................................... P. 2001-238333

(51) Int. Cl.[7] .............................................. G11B 7/085
(52) U.S. Cl. ................................ 369/44.29; 369/44.27; 369/44.25
(58) Field of Search .......................... 369/44.29, 53.28, 369/44.27, 44.11, 44.25

(56) References Cited

U.S. PATENT DOCUMENTS

| 5,642,340 | A | * | 6/1997 | Nomura | 369/44.25 |
| 6,243,341 | B1 | * | 6/2001 | Hasimoto | 369/53.22 |
| 6,278,672 | B1 | * | 8/2001 | Kobayashi | 369/53.23 |
| 6,545,956 | B2 | * | 4/2003 | Shimamura et al. | 369/44.27 |
| 6,744,705 | B1 | * | 6/2004 | Sumida et al. | 369/44.11 |

FOREIGN PATENT DOCUMENTS

| JP | 3-156731 | 7/1991 |
| JP | 05-334688 | 12/1993 |

* cited by examiner

*Primary Examiner*—Brian F. Drula
*Assistant Examiner*—Michael V. Battaglia
(74) *Attorney, Agent, or Firm*—Morgan, Lewis & Bockius LLP (57) ABSTRACT

According to the method, the focusing servo is activated at the zero-crossing point of a focusing error signal FE immediately after the focusing error signal FE has exceeded the first threshold th1 or has dropped below the second threshold th2. The absolute value of the first threshold th1 and the second threshold th2 is reduced each time a predetermined time t is elapsed until the focusing servo is activated.

5 Claims, 6 Drawing Sheets

DISC APPARATUS AND A METHOD FOR ACTIVATING A FOCUSING SERVO

BACKGROUND OF THE INVENTION

The present invention relates to a method for activating a focusing servo that automatically makes adjustment so that the focal point of a light irradiated onto a disc tracks the recording surface of the disc in order to read/write information from/onto the disc as a disc-shaped recording medium, and disc apparatus comprising at least one of a feature to regenerate information from a disc and a feature to record information onto a disc.

Figure 6:
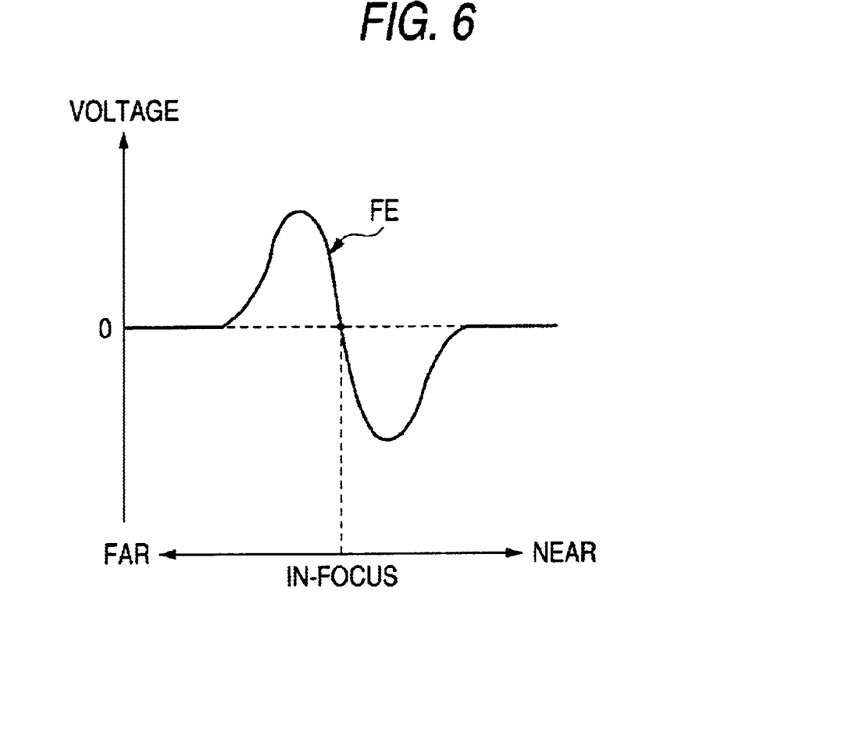
FIG. 6 shows exemplary characteristics of a focusing error signal.

A focusing error signal FE indicating the amount of dislocation of the focal point of a light irradiated onto a disc from the recording surface of the disc typically varies depending on the relation between the focal point of a light irradiated onto the disc and the disc, for example as shown in FIG. 6. That is, in the state where the focal point of a light irradiated onto a disc is on the recording surface (hereinafter referred to as "in-focus state"), the focusing error signal FE obtains a value of 0. When the focal point is in close proximity of the in-focus state, the absolute value in the positive polarity of the signal increases as the focal point moves away from the recording surface of a disc. The absolute value in the negative polarity of the signal increases as the focal point approaches the recording surface of a disc. When the focal point is not in close proximity of the in-focus state, the absolute value of the signal becomes smaller as the focal point approaches the recording surface of a disc. Finally, the spot size becomes larger than the light-receptive surface thus providing a value of 0.

In order to let a focus servo so that the in-focus state is maintained, the focusing servo must be activated in close proximity of the in-focus state. In order to realize this, the basic concept is that the in-focus state is detected at the zero-crossing point of the focusing error signal FE (the point where the focusing error signal FE passes through 0) in order to activate the focusing servo.

Figure 7:
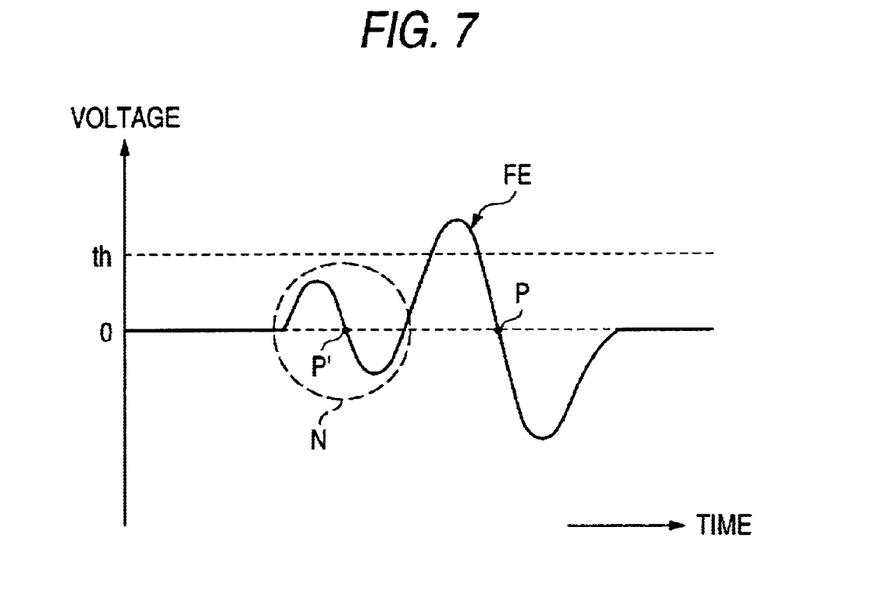
FIG. 7 shows an example of a focusing error signal containing a noise factor.

However, simply activating the focusing servo at the zero-crossing point of the focusing error signal FE results in erroneous detection of the in-focus state at the zero-crossing point P' of a noise N (a point not in close proximity of the in-focus state) thus activating the focusing servo in case focusing error signal FE contains the noise N. This causes the focusing servo to maintain a state other than the in-focus state. In order to solve this problem, a focusing servo used to be activated at a zero-crossing point P of the focusing error signal FE immediately after the focusing error signal FE has exceeded a fixed threshold th.

From the viewpoint of preventing erroneous detection of an in-focus state caused by a noise factor, the threshold is desirably as large as possible. On the other hand, the amplitude of a focusing error signal is varied depending on the individual difference of a photo-detector. In case the threshold is too large, the focusing error signal does not exceed the threshold so that it is not possible to activate a focusing servo.

Thus, the threshold must be set considering the variation in the amplitude of the focusing error signal so that the focusing servo may be activated without being affected by the variation in the amplitude of the focusing error signal. The greater the variation in the amplitude of the focusing error signal, the smaller the threshold must be, in order to correctly detect the in-focus state. Setting too small a threshold causes erroneous recognition of a noise as the in-focus state.

While the Unexamined Japanese Patent Application Publication No. Hei3-156731 discloses an invention whereby only a focusing error signal is used to correctly and stably detect an in-focus state, the aforesaid problem arises because the threshold is fixed.

SUMMARY OF THE INVENTION

The invention aims at providing a method for activating a focusing servo stably, the method less affected by a noise.

In order to attain the aforementioned object, the invention provides a method for activating a focusing servo that activates a focusing servo at the point a focusing error signal passes through zero after the amplitude of the focusing error signal of an approximate S shape indicating the amount of dislocation of the focal point of a light irradiated onto a disc from the recording surface of the disc has exceeded a threshold during a focus search where the operation to bring the focal point of a light irradiated onto the disc closer to a disc alternates with the operation of moving the focal point of the light away from the disc, characterized in that the threshold is varied in stages each time a predetermined time has elapsed until the focusing servo is activated.

According to this method, it is possible to activate a focusing servo without fail while reducing the effect of a noise, by setting the minimum value of the threshold considering the variations in the amplitude of the focusing error signal, in case the characteristics of the focusing error signal are as shown in FIG. 6.

In case a focusing servo is activated for the same disc, it is possible to use a value set when the focusing servo was activated the previous time as the initial value of the threshold. In case the focusing servo is activated for the same disc, the threshold mat be fixed.

DETAILED DESCRIPTION OF THE PREFERRED EMBODIMENTS

Figure 1:
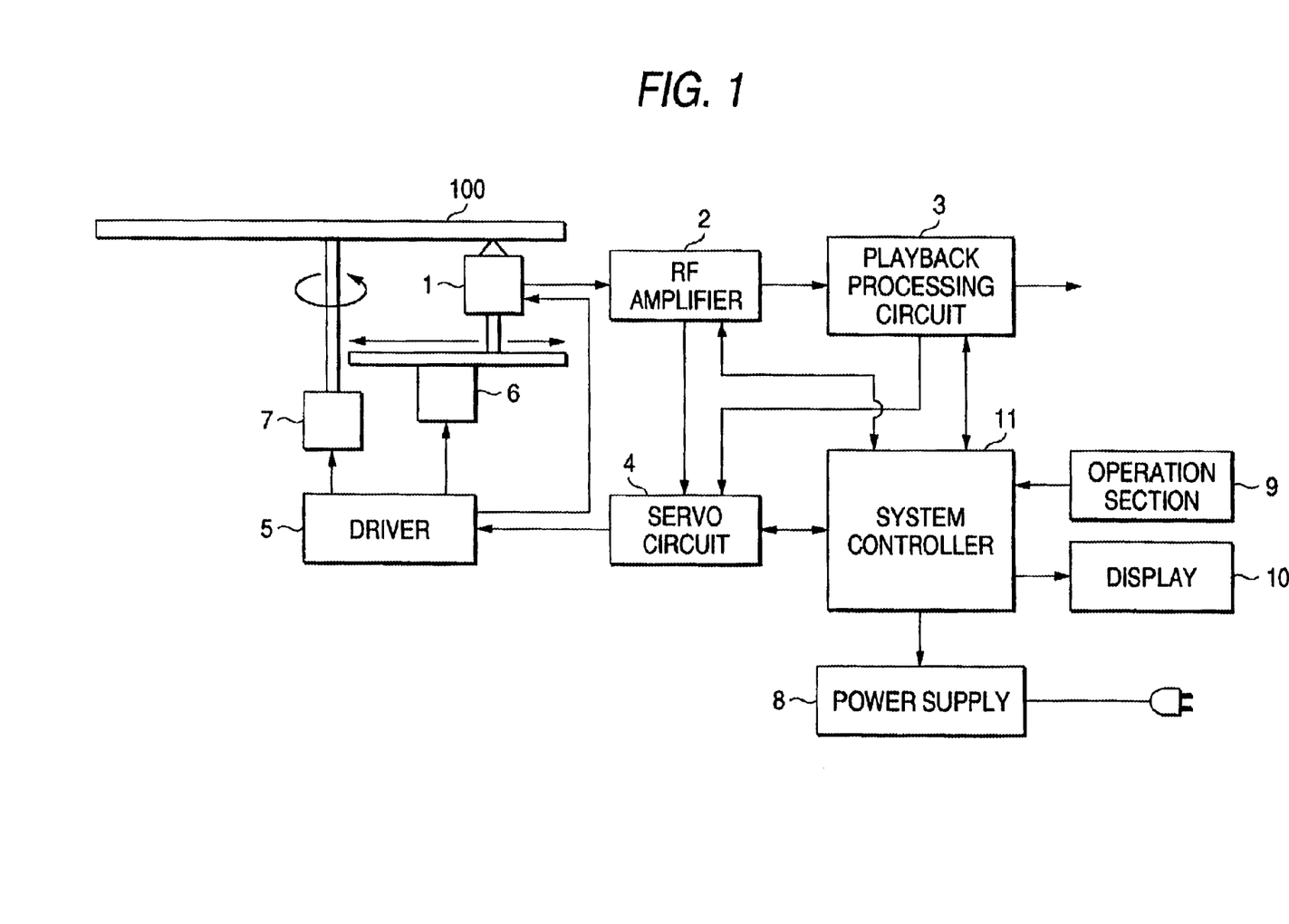
FIG. 1 is a block diagram of disc playback apparatus that employs the focusing servo activating method of the invention.

An embodiment of the invention will be described referring to the drawings. FIG. 1 is a block diagram of disc playback apparatus that employs the focusing servo activating method of the invention. A pickup 1 optically reads signals recorded on the disc 100 by irradiating a laser beam onto the disc 100 and converting the reflected light from the disc 100 to an electric signal. The pickup 1 has a focusing actuator for moving the focal point of the laser beam irradiated onto the disc 100 in its optical axis direction and a tracking actuator for moving the laser beam in the radius direction of the disc 100.

An RF amplifier 2 amplifies a signal read by the pickup 1 and supplies the resulting signal to a playback processing circuit 3 as well as generates a focusing signal and a tracking error signal and supplies these signal to a servo circuit 4. The playback processing circuit 3 applies demodulation, error detection and correction processing on the signal from the RF amplifier 2 to regenerate information. The playback processing circuit 3 generates a signal indicating the revolution speed of the disc 100 from the signal supplied by the RF amplifier 2 and supplied the resulting signal to the servo circuit 4.

The servo circuit 4 generates a focusing actuator drive signal, a tracking actuator derive signal and a feed motor drive signal respectively based on the focusing error signal and the tracking error signal supplied from the RF amplifier 2. The servo circuit 4 generates a spindle motor drive signal for assuming the revolution speed of the disc 100 as a target value based on the signal indicating the revolution speed of the disc 100 supplied from the playback processing circuit 3.

A driver 5 drives the focusing actuator, the tracking actuator, a feed motor 6 and a spindle motor 7 in the pickup 1 respectively based on the focusing actuator drive signal, the tracking actuator drive signal, the feed motor drive signal and the spindle motor drive signal.

The feed motor 6 is a motor for moving the pickup 1 in the radius direction of the disc 100. The spindle motor 7 is a motor for revolving the disc 100. A power supply 8 generates an appropriate dc voltage from a commercial ac power supply and supplies the dc voltage to each section as a source voltage via wiring (not shown).

An operation section 9 is provided for the user to input various instructions to the disc playback apparatus. An instruction input to the disc playback apparatus by the user is given to a system controller 11. A display 10 displays the time, information to indicate the operating state of the disc playback apparatus and information on the data under playback (for example the title of a tune under playback). The system controller is composed of for example a microcomputer and controls the components of the disc playback apparatus in accordance with the instruction input to the disc playback apparatus by the user.

Figure 2:
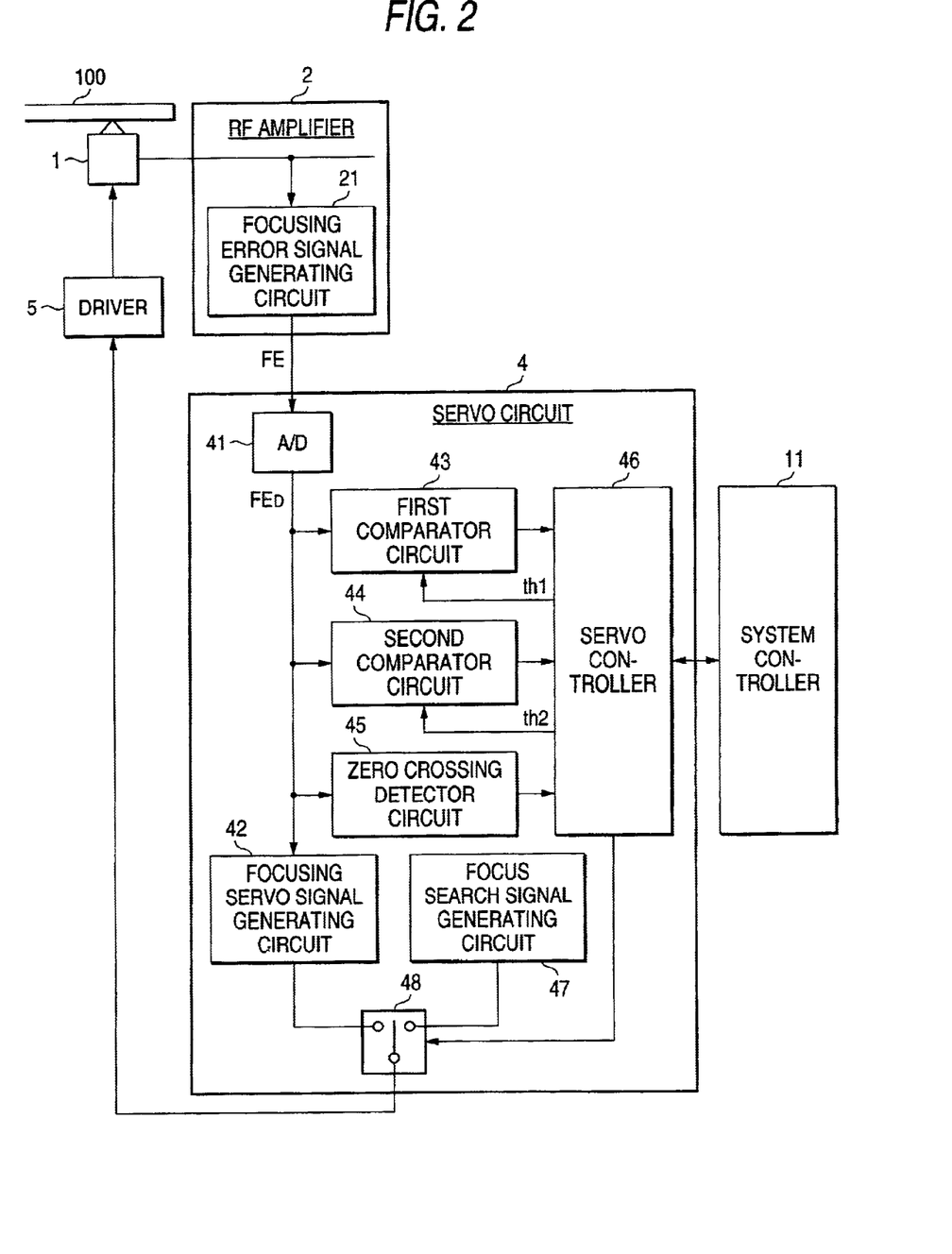
FIG. 2 is a block diagram of a portion of the disc playback apparatus related to the focusing servo shown in FIG. 1.

FIG. 2 is a block diagram of a portion of the disc playback apparatus related to the focusing servo shown in FIG. 1. A focusing error signal generating circuit 21 generates a focusing error signal FE having the characteristics shown in FIG. 6, based on the signal supplied from the pickup 1.

The focusing error signal FE is converted to a digital signal $FE_D$ by an A/D converter 41 and supplied to a focusing servo signal generating circuit 42, a first comparator circuit 43, a second comparator circuit 44, and a zero crossing detector circuit 45. The focusing servo signal generating circuit 42 generates a focusing servo signal F-SRV for driving the focusing error signal FE to 0.

The second comparator circuit 43 compares the focusing error signal $FE_D$ with a first threshold $V_{th1}$ supplied from a servo controller 46 and outputs a signal indicating the comparison result. The second comparator circuit 44 compares the focusing error signal $FE_D$ with a second threshold $V_{th2}$ supplied from the servo controller 46 and outputs a signal indicating the comparison result. The first threshold $V_{th1}$ is a positive value and the second threshold $V_{th2}$ is a negative value. The absolute value of the first threshold $V_{th1}$ is the same as that of the second threshold $Vth_2$. The zero crossing detector circuit 45 outputs a signal to detect the zero crossing point of the focusing error signal $FE_D$ and indicate the timing of the zero-crossing point.

The servo controller 46 respectively determines whether the focusing error signal $FE_D$ is larger than the first threshold $V_{th1}$ based on the output of the first comparator circuit 43, whether the focusing error signal $FE_D$ is smaller than the second threshold $V_{th2}$ based on the output of the second comparator circuit 44, and whether the zero-crossing point of the focusing error signal $FE_D$ has been detected based on the output of the zero crossing detector circuit 45.

A focus search signal generating circuit 47 generates a focus search signal F-SRCH for performing a focus search, that is, repeated alternating operations of moving the focal point of a laser beam irradiated onto the disc 100 closer to and away from the disc 100.

A switch 48 is a switch for selecting the focusing servo signal F-SRV or focus search signal F-SRCH as a focusing actuator drive signal to be supplied to the driver 5. The switch 48 is changed over by the servo controller 46.

The driver 5 drives the focusing actuator in the pickup 1 based on the focusing actuator drive signal (that is, the focusing servo signal F-SRV or focus search signal F-SRCH) supplied from the servo circuit 4. Thus, by changing over the switch 48, it is possible to select the focus search mode or focusing servo mode.

An operation of the servo controller 46 will be described referring to the flowchart of FIG. 3 that takes place when an instruction to activate the focusing servo is input from the system controller 11. The servo controller 46 performs various initializations (#1). The step #1 includes processing to initialize the first and second thresholds. Next, the servo controller 46 selects the focus search mode (starts a focus search) (#2). Then the servo controller 46 resets the value of the internal counter (#3). The counter value is incremented by one at a predetermined cycle.

The servo controller 46 then determines whether the focusing error signal is larger than the first threshold (#4). In case the focusing error signal is larger than the first threshold as a result of decision in step #4 (Yes in step #4), execution proceeds to step #6 mentioned later. In case the focusing error signal is not larger than the first threshold (No in step #4), the servo controller 46 determines whether the focusing error signal is smaller than the second threshold (#5).

In case the focusing error signal is smaller than the second threshold as a result of decision in step #5 (Yes in step #5), execution proceeds to step #6 mentioned later. In case the focusing error signal is not smaller than the second threshold (No in step #5), execution proceeds to step #9 mentioned later.

In step #6, the servo controller 46 sets the in-focus wait flag of the internal register. Then the servo controller 46 determines whether the zero-crossing point of the focusing error signal has been detected (#7). In case the zero-crossing point of the focusing error signal has been detected (Yes in step #7), the servo controller 46 switches to the focusing servo mode (activates the focusing servo) (#8). In case the zero crossing point of the focusing error signal has not been detected (No in step #7), execution proceeds to step #9 mentioned later.

The servo controller 46 may determine whether focus is achieved after the focusing servo is activated in step #8, and if not, execution may proceed to step #2 mentioned earlier. This assures that the system will leave the state without delay where a focus is not achieved when the focusing servo is activated.

In step #9, the servo controller 46 determines whether the value of the counter is equal to or larger than a predetermined value. In case the value of the counter is equal to or larger than the predetermined value as a result of decision in step #9 (Yes in step #9), the servo controller 46 updates the absolute value of the first threshold th1 and the second threshold th2 to a value smaller by one step (#10), then resets the in-focus wait flag (#11). When execution completes step #11, it proceeds to step #3.

In case the counter value is smaller than the predetermined value as a result of decision in step #9 (No in step #9), the servo controller 46 determines whether the in-focus wait flag is set (#12). In case the in-focus wait flag is set as a result of decision in step #12 (Yes in step #12), execution proceeds to step #7 mentioned earlier. In case the in-focus wait flag is not set (No in step #12), execution proceeds to step #4 mentioned earlier.

When the focusing error signal becomes larger than the first threshold or smaller than the second threshold in a focus search, the focusing servo is activated at the zero-crossing point of the focusing error signal. The thresholds for detecting the in-focus state (first threshold $V_{th1}$ and second threshold $V_{th2}$) are reduced each time a predetermined time is elapsed, from the start of a focus search to activation of the focusing servo. The predetermined time is set to for example 1 ms.

Figure 4A:
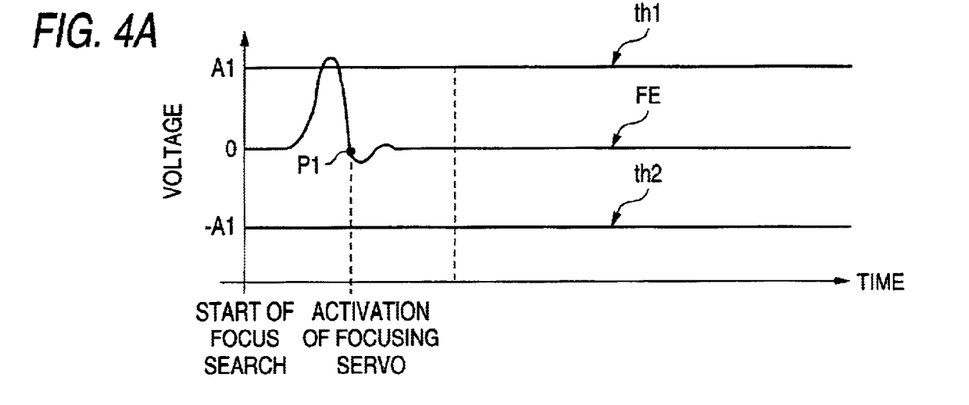
FIG. 4 explains the timing the focusing servo is activated.
Figure 4B:
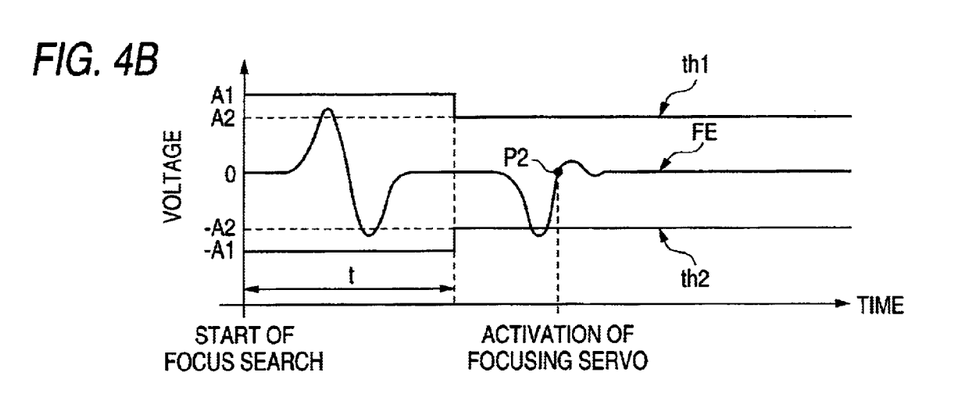
Figure 4C:
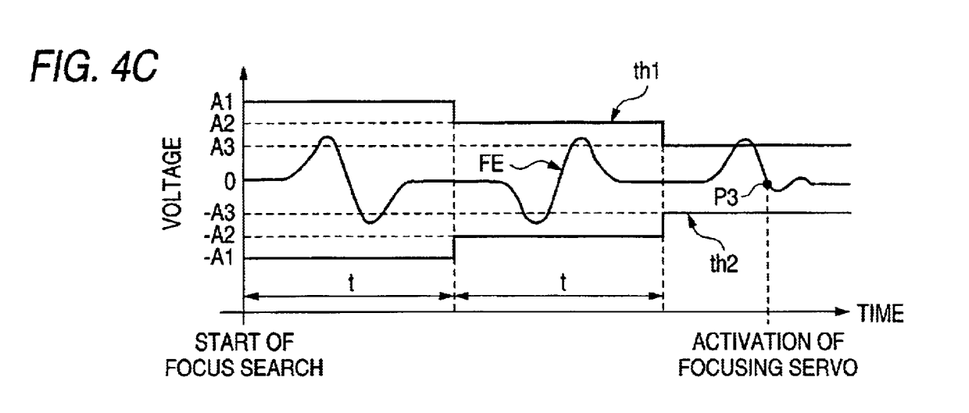

Assume that three values A1, A2 and A3 (A1>A2>A3) are provided as absolute values of the first threshold th1 and the second threshold th2. Then the focusing servo is activated at the point P1 shown in FIG. 4(a) when the amplitude of the focusing error signal FE is larger than A1, at the point P2 shown in FIG. 4(b) when the amplitude is smaller than A1 and larger than A2, or at the point P3 shown in FIG. 4(c) when the amplitude is smaller than A2 and larger than A3. The absolute value of the first threshold and the second threshold th2 is A1 at the beginning of a search while it sequentially changes to A2 and A3 each time the predetermined time t is elapsed until the focusing servo is activated.

Thus, it is possible to detect the focusing error signal in the in-focus state provided that the amplitude of the focusing error signal is larger than the noise level. Further, setting the minimum absolute value of the threshold for detecting the in-focus state below the minimum value of the variation in the amplitude of the focusing error signal ensures activation of the focusing servo with smaller influence of a noise.

In case setting the absolute values of the thresholds for detecting the in-focus state to minimum does not activate the focusing servo, the absolute value of the thresholds for detecting the in-focus state may be set to 0. In this way, it is possible to activate the focusing servo even in case the amplitude of the focusing error signal becomes extremely small for some cause.

In case the focusing servo is activated for a same disc by using the same apparatus, the amplitude of the focusing error signal is stable so that the thresholds for detecting the in-focus state may not be initialized. It is possible to use values set when the focusing servo is activated the previous time as initial values of the thresholds for detecting the in-focus state. Processing may be simplified to fix the threshold for detecting the in-focus state. In this way, it is possible to eliminate the wait time to the update of the threshold for detecting the in-focus state thus reducing the time to activation of the focusing servo.

Figure 5:
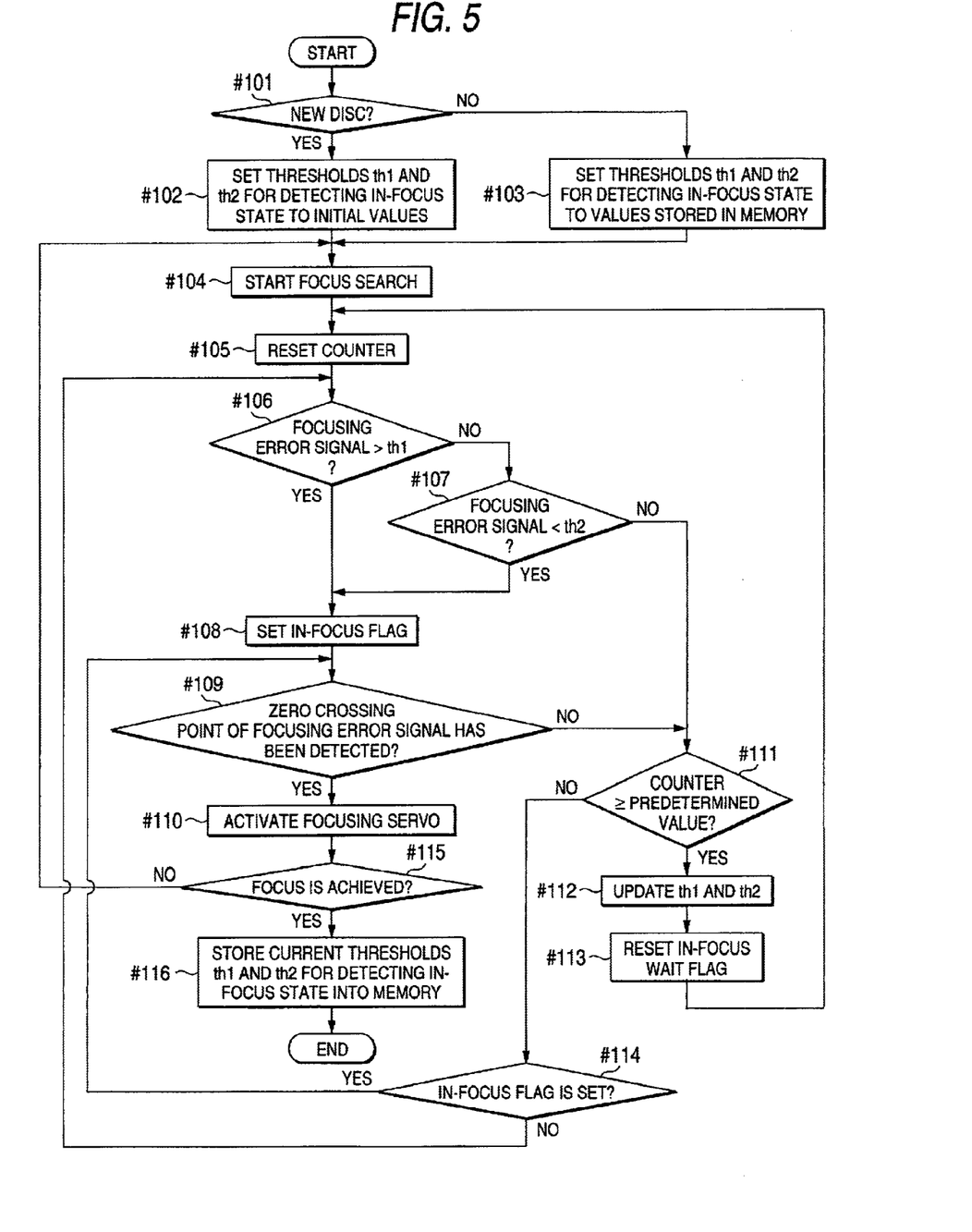
FIG. 5 is a flowchart showing another operation of the servo controller that takes place when an instruction to activate the focusing servo is input from the system controller.

An example of the servo controller 46 to perform this processing will be explained referring to the flowchart of FIG. 5. When the disc is new (disc is replaced with a new one) (Yes in step #101), the servo controller 46 sets the thresholds for detecting the in-focus state to initial values (#102). Otherwise (in case the disc is not replaced) (No in step #101) the servo controller 46 sets the thresholds for detecting the in-focus state to values stored in memory (#103). When steps #102 and #103 are complete, the servo controller 46 starts a focus search (#104).

Figure 3:
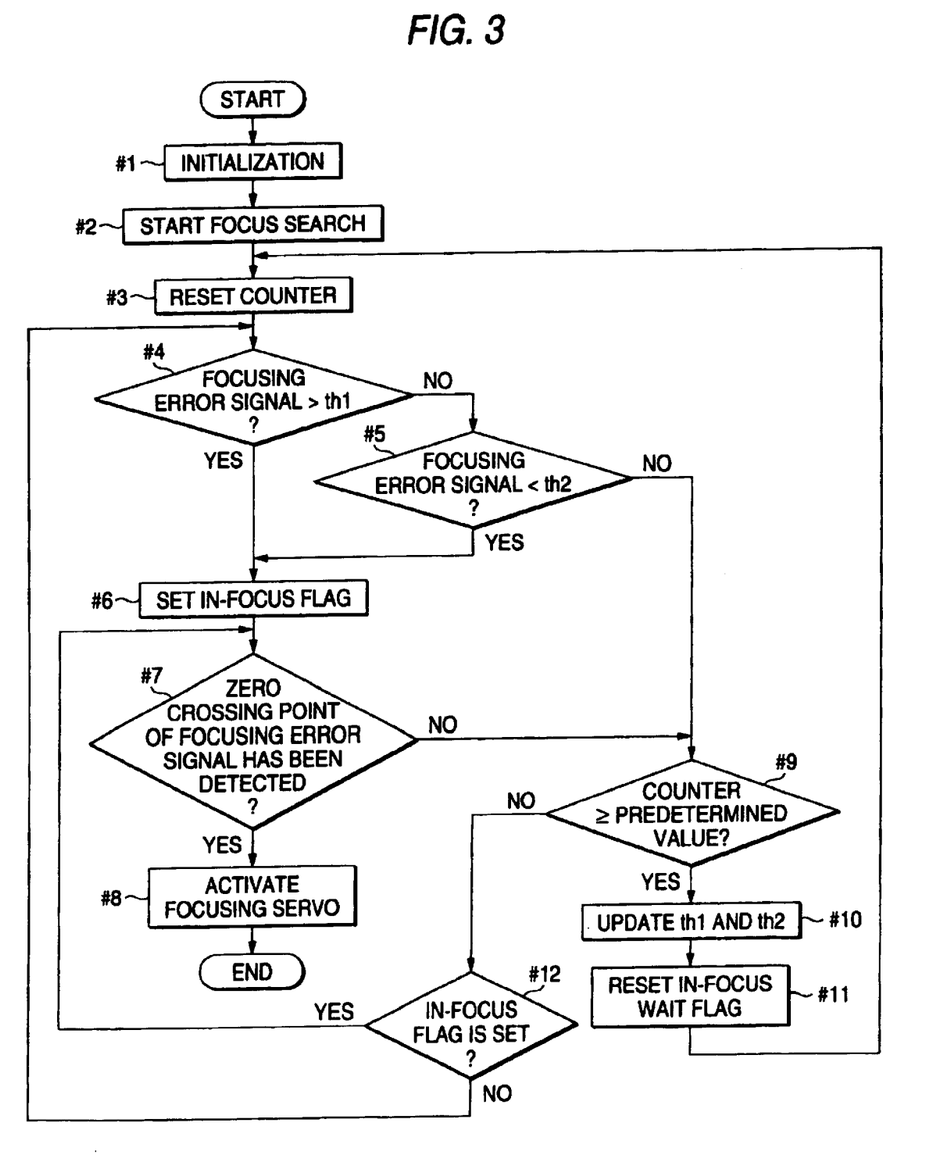
FIG. 3 is a flowchart showing an operation of the servo controller that takes place when an instruction to activate the focusing servo is input from the system controller.

Steps #105 through #114 are equivalent to steps 33 through #12 in the flowchart of FIG. 3 so that the corresponding description is omitted. The servo controller 46, activating the focusing servo in step #110, determines whether focus is achieved (#115). In case the focus is achieved (Yes in step #115), the servo controller 46 stores the current thresholds for detecting the in-focus state into memory (#116). In case the focus is not achieved (No in step #115), execution proceeds to step #104 mentioned earlier.

In case the operation of the servo controller 46 activates the focusing servo for the same disc, values set when the focusing servo is activated the previous time as initial values of the thresholds for detecting the in-focus state is used.

While the foregoing embodiment is disc playback apparatus for regenerating information from a disc, the invention may be applied to disc recording apparatus for recording information onto a disc or disc recording/playback apparatus comprising a feature to regenerate information form a disc and a feature to record information onto a disc.

As mentioned hereabove, according to the invention, it is possible to activate a focusing servo without fail while reducing the effect of a noise.

What is claimed is:

1. Disc apparatus with a feature to regenerate information from a disc, comprising:

a pickup for optically reading signals recorded on the disc by irradiating a laser beam onto the disc and converting the reflected light from the disc to an electric signal, a focusing actuator for moving the focal point of the laser beam irradiated onto the disc in an optical axis direction thereof, a focusing error signal generating circuit for generating a focusing error signal of an approximate S shape indicating the amount of dislocation of the focal point of a light irradiated onto the disc from the recording surface of the disc based on the signal read by said pickup, a focusing servo signal generating circuit for generating a focusing servo signal tracking the focal point of a laser beam irradiated onto the disc to the recording surface of the disc based on the focusing error signal, a focus search signal generating circuit for generating a focus search signal for performing repeated alternating operations of moving the focal point of a laser beam irradiated onto the disc closer to and away from the disc, a driver for driving said focusing actuator based on the a focusing actuator drive signal, and a switch for selecting a focusing servo mode where the focusing servo signal is supplied to said driver as the focusing actuator drive signal, or a focus search mode where the focus search signal is supplied to said driver as the focusing actuator drive signal, and a servo controller for changing in stages a first threshold and a second threshold each time a predetermined time is elapsed, once said switch is positioned to select said focus search mode, wherein the first threshold is positive, the second threshold is negative and an absolute value of the first threshold is the same as an absolute value of the second threshold, wherein if the amplitude of the focus error signal does not pass over the first or second threshold, the first and second thresholds are changed to a third and a fourth threshold, respectively, the third threshold being less than the first threshold, the fourth threshold being greater than the second threshold, and an absolute value of the third threshold being the same as an absolute value of the fourth threshold, and wherein the focusing servo mode is activated at the point the focusing error signal passes through zero immediately after the amplitude of the focusing error signal exceeds one of the thresholds.

2. A method for activating a focusing servo that automatically makes adjustment so that the focal point of a light irradiated onto a disc tracks the recording surface of the disc in order to read/write information from/onto the disc as a disc-shaped recording medium, said method comprising the steps of:

activating the focusing servo at the point a focusing error signal passes through zero immediately after the amplitude of the focusing error signal exceeds a threshold, the focusing error signal having an approximate S shape indicating the amount of dislocation of the focal point of a light irradiated onto the disc from the recording surface of the disc, performing a focus search in which alternating operations of moving the focal point of a laser beam irradiated onto the disc closer to and away from the disc is repeated, and changing in stages the threshold each time a predetermined time is elapsed until the focusing servo is activated, the changing the threshold in stages including:

changing the threshold to a first threshold and a second threshold, the first threshold being positive, the second threshold being negative and an absolute value of the first threshold being the same as an absolute value of the second threshold, and changing the first and second thresholds to a third and a fourth threshold, respectively, if the amplitude of the focus error signal does not pass over the first or second threshold, the third threshold being less than the first threshold, the fourth threshold being greater than the second threshold, and an absolute value of the third threshold being the same as an absolute value of the fourth threshold.

3. The method for activating a focusing servo according to claim 2, wherein a value set when the focusing servo is activated the previous time is used as the initial value of the threshold in case a focusing servo is activated for the same disc.

4. The method for activating a focusing servo according to claim 3, wherein the threshold is fixed in case a focusing servo is activated for the same disc.

5. The method for activating a focusing servo according to claim 2, wherein if the amplitude of the focusing error signal does not exceed the threshold after the first and second thresholds are changed to the third and the fourth thresholds, the threshold is thereafter changed to zero.

* * * * *